US006635722B2

(12) United States Patent
Li et al.

(10) Patent No.: US 6,635,722 B2
(45) Date of Patent: Oct. 21, 2003

(54) MOISTURE-CURABLE POLYURETHANE HOT MELT ADHESIVES CONTAINING REACTIVE AMINE CATALYSTS

(75) Inventors: Yingjie Li, Batavia, IL (US); Jason D. Lohrey, Plano, IL (US)

(73) Assignee: Henkel Corporation, Gulph Mills, PA (US)

( * ) Notice: Subject to any disclaimer, the term of this patent is extended or adjusted under 35 U.S.C. 154(b) by 5 days.

(21) Appl. No.: 09/847,512

(22) Filed: May 2, 2001

(65) Prior Publication Data

US 2002/0013406 A1 Jan. 31, 2002

Related U.S. Application Data

(60) Provisional application No. 60/201,095, filed on May 2, 2000.

(51) Int. Cl.[7] .............................................. C09J 175/04
(52) U.S. Cl. ...................... 525/453; 525/403; 525/408; 525/440; 528/49; 528/53; 528/59
(58) Field of Search ................................. 525/440, 453, 525/403, 408; 528/59, 49, 53

(56) References Cited

U.S. PATENT DOCUMENTS

| 4,338,408 A | | 7/1982 | Zimmerman et al. |
| 5,173,538 A | * | 12/1992 | Gilch et al. ................. 525/130 |
| 5,360,642 A | | 11/1994 | Chandalia et al. |
| 5,369,208 A | | 11/1994 | Stuber et al. |
| 5,391,614 A | | 2/1995 | Chandalia et al. |
| 5,550,191 A | | 8/1996 | Hung et al. |
| 6,020,429 A | | 2/2000 | Yang et al. |
| 6,207,248 B1 | * | 3/2001 | Yang et al. ................. 428/102 |

FOREIGN PATENT DOCUMENTS

| WO | WO 97/19122 | 5/1997 |
| WO | WO 98/58005 | 12/1998 |

OTHER PUBLICATIONS

Szycher, Mark, Ph.D., Szycher's Handbook of Polyurethanes, 1999, pp. 10–3, 10–4.
Huntsman Corporation, JEFFCAT® Amine Catalysts For The Urethane Industry, 1999.
Huntsman Corporation, "JEFFCAT® DMDEE Catalyst," Technical Bulletin, 1995.
Huntsman Corporation, "JEFFCAT® DPA Catalyst," Technical Bulletin, 1998.
Huntsman Corporation, "JEFFCAT® ZR–50 Catalyst," Technical Bulletin, 1995.
Huntsman Corporation, "JEFFCAT® ZF–10 Catalyst," Technical Bulletin, 1998.

* cited by examiner

Primary Examiner—Patricia A. Short
(74) Attorney, Agent, or Firm—Brooks Kushman P.C.

(57) ABSTRACT

A catalyzed reactive hot melt adhesive, a method for improving the cure rate and a method for making thereof. The adhesive includes the reaction product of a reactive polyurethane adhesive and a catalytically effective amount of at least one amine catalyst with at least one active hydrogen.

12 Claims, No Drawings

MOISTURE-CURABLE POLYURETHANE HOT MELT ADHESIVES CONTAINING REACTIVE AMINE CATALYSTS

CROSS-REFERENCE TO RELATED APPLICATION

This application claims the benefit of U.S. provisional application Ser. No. 60/201,095, filed May 2, 2000.

BACKGROUND OF THE INVENTION

1. Field of the Invention

This invention relates to polyurethane hot melt adhesives that are moisture-curable and contain reactive amine catalysts. The invention also comprehends a method for accelerated moisture-curing of polyurethane reactive hot melt adhesives using one or more catalysts that contain active hydrogen.

2. Background Art

Traditionally, reactive hot melts are considered to be the most completely solid, solvent-free, single component urethane prepolymers. Conventional hot melts can metamorphose from a solid to a liquid state. In contrast, reactive hot melts undergo an irreversible chemical reaction ("thermosetting") once exposed to ambient moisture.

Reactive polyurethane hot melt adhesives are solvent-free polyurethane prepolymers end-capped with isocyanate groups which are solid at ambient temperatures. Such adhesives are melted or liquidified by heating and then applied to a substrate. During and particularly after application, the isocyanate groups react with water molecules from ambient moisture as well as in the substrate itself to form a thermoset. Such thermosets exhibit adhesive properties superior to those obtained from conventional hot melts which do not contain reactive isocyanate groups.

Even though the initial or "green" strength of reactive polyurethane hot melt adhesives is sufficiently high that the bonded substrates can be readily handled, typical moisture curing of such adhesives takes days to fully accomplish without a catalyst. It is desirable to accelerate curing of the adhesive, especially in the first day or so after application so that the bonded parts could be easily shipped and delivered shortly after the bond is created. However, conventional polyurethane catalysts such as those based on heavy metals (e.g., tin) may compromise the thermal stability of the adhesive.

The use of 2,2'-dimorpholinodiethyl ether (DMDEE) and similar morpholino-containing substances as catalysts in reactive polyurethane hot melt adhesives is known from U.S. Pat. Nos. 5,550,191 and 6,020,429 (incorporated herein by reference in their entirety). It is said that catalysts of this type could speed up the moisture cure without significantly affecting thermal stability. However, the incorporation of such catalysts provides adhesives which are not free of volatile organic compounds (VOCs). Indeed, DMDEE is reported by Huntsman Corporation to contain about 76% VOCs. This determination has been made using ASTM Protocol D-2369, also known as EPA Method 24. This testing protocol measures the percentage weight loss after heating in an oven at 100° C. for one hour. It is known that DMDEE can be used as a catalyst for moisture curing of liquid, one component polyurethane adhesives during applications at ambient temperature, as DMDEE evaporates slowly at ambient temperature. During application at elevated temperatures, such fugitive catalysts can escape from the adhesive. In addition to the environmental problems thereby created, the loss of catalyst will make the curing rate less consistent than would be desirable. This will be particularly pronounced in open roll coater applications where the adhesives are constantly exposed to high temperatures (e.g., 121° C.) and a strong, open ventilation air flow. With different exposure times, different DMDEE residues in the adhesives will result in a curing rate that is dependent on exposure time.

WO 97/19122 describes a one-component reactive polyurethane adhesive containing catalysts having at least one tertiary amine and at least one functional group such as —OH capable of being incorporated into the polyurethane. This reference lists suitable catalysts and mentions hot melt adhesives. However, the catalyst is used at a high concentration (at least 1%), and teaches that lower concentrations will not provide satisfactory reactivity. At concentrations above 1%, however, reactive hot melts tend to exhibit poor stability.

SUMMARY OF THE INVENTION

The invention includes a catalyzed reactive hot melt adhesive that comprises the reaction product of a reactive polyurethane adhesive and a catalytically effective amount of at least one amine non-fugitive catalyst with at least one active hydrogen, a method for reducing the curing time, and a method for making it.

The disclosed hot melt adhesive circumvents the aforementioned problems in that it uses a reacted-in catalyst system based on one or more tertiary amine catalysts containing at least one active hydrogen (i.e., at least one functional group capable of reacting with the isocyanate groups present in the polyurethane prepolymer). Such a reaction leads to incorporation of the catalyst into the polyurethane and thermoset adhesive derived therefrom, rendering the catalyst non-volatile.

Adhesive systems which are VOC-free and yet still exhibit accelerated curing rates are thus provided. Moisture cure rate is still desirably accelerated, especially in the first 24 hours. Thermal stability of the adhesive is not significantly affected. More consistent curing is possible as compared to DMDEE-catalyzed systems since the catalyst, once reacted, is not volatile and thus has a greatly reduced tendency to escape from the adhesive during application.

DETAILED DESCRIPTION OF THE PREFERRED EMBODIMENTS

The invention discloses a catalyzed reactive hot melt adhesive and a method for increasing the moisture curing rate of the reactive hot melt adhesive. The adhesive includes the reaction product of a polyurethane adhesive and a catalytically effective (as defined later herein) amount of at least one amine catalyst containing at least one active hydrogen. The curing speed is achieved by incorporating about 0.005 to about 0.5% by weight of the amine catalyst.

Preferably, the active hydrogen-containing functional group is an hydroxyl (—OH) group. In one desirable embodiment of the invention, the hydroxyl group is present as part of an alkanol group attached to a tertiary amine or ether oxygen. In desirable embodiments of the invention, the catalyst does not contain any primary or secondary amine groups. Preferably, at least two tertiary amine groups are present. Mixtures of different catalysts can be utilized. Suitable catalysts for purposes of the present invention include the following substances:

N,N,N'-trimethyl-N-hydroxyethyl-bisaminoethyl ether (commercially available as JEFFCAT ZF-10 from Huntsman Corp.)

N,N-bis (3-dimethylaminopropyl)-N-isopropanol amine (commercially available as JEFFCAT ZR-50 from Huntsman Corp.)

N-(3-dimethylaminopropyl)-N,N-diisopropanolamine (commercially available as JEFFCAT DPA from Huntsman Corp.)

N,N-dimethylethanolamine (commercially available as JEFFCAT DMEA from Huntsman Corp.)

2-(2-dimethylaminoethoxy) ethanol (commercially available as JEFFCAT ZR-70 from Huntsman Corp.)

The catalyst is used in effective amounts, i.e., an amount effective to catalyze the desired moisture cure of the polyurethane prepolymer. Generally, the amounts vary within the range of about 0.005 to about 0.5% by weight, preferably 0.005 to about 0.1% by weight. The optimum amount depends upon the isocyanate content of the prepolymer, the desired cure rate, temperature, moisture level, and other factors.

The other components of the reactive polyurethane hot melt adhesives may be any of the substances known in the field, such as those described in more detail in U.S. Pat. Nos. 5,550,191 and 6,020,429 (incorporated herein by reference in their entirety).

Experiments were conducted using a commercial reactive polyurethane hot melt adhesive based on a polyether-polyester-MDI-based polyurethane, known as R243, which is available from Henkel Corporation. This adhesive ("Formulation 1") contains no catalyst. The curing profile and viscosity increase (expressed as viscosity divided by starting viscosity) of R243 with 0.02 wt % DMDEE catalyst added ("Formulation 2") and R243 with 0.02 wt % N,N,N'-trimethyl-N'-hydroxyethylbisaminoethyl ether added (inventive "Formulation 3") were also evaluated. The viscosity increase of a satisfactory catalyzed reactive hot melt adhesive should approximate the viscosity increase of the uncatalyzed system in order to achieve good thermal stability.

TABLE I

| NO. | FORMULATION |
|---|---|
| 1 | R243 |
| 2 | R243 + 0.02 wt % DMDEE |
| 3 | R243 + 0.02 wt % N,N,N'-trimethyl-N'-hydroxyethylbisaminoethyl ether (Invention) |

(A) VISCOSITY PROFILE

| | FORMULATION | | |
|---|---|---|---|
| TIME | 1 | 2 | 3 |
| 30 MINUTES | 1.00 | 1.00 | 1.00 |
| 1 HOUR | 1.07 | 1.07 | 1.08 |
| 2 HOURS | 1.15 | 1.15 | 1.17 |
| 4 HOURS | 1.30 | 1.30 | 1.37 |
| 6 HOURS | 1.47 | 1.48 | 1.63 |
| 8 HOURS | 1.57 | 1.60 | 1.82 |

(B) VISCOSITY PROFILE

| | FORMULATION | | |
|---|---|---|---|
| TIME | 1 | 2 | 3 |
| 1 HOUR | 1.00 | 1.00 | 1.00 |
| 2 HOURS | 1.07 | 1.07 | 1.07 |
| 3 HOURS | 1.19 | 1.21 | 1.22 |
| 4 HOURS | 1.28 | 1.28 | 1.32 |

TABLE I-continued

| 5 HOURS | 1.32 | 1.42 | 1.40 |
|---|---|---|---|
| 6 HOURS | 1.42 | 1.54 | 1.56 |
| 7 HOURS | 1.46 | 1.60 | 1.63 |
| 8 HOURS | 1.55 | 1.70 | 1.75 |

Minor differences in the viscosity increase (which are indicative of thermal stability) of the three formulations were thus observed when the adhesive formulations were exposed to an open cell (Brookfield system) at 121° C. The catalyzed systems, Formulations 2 and 3, showed a faster viscosity increase compared to the uncatalyzed system, Formulation 1, which is expected. Formulation 3 also showed a slightly faster viscosity increase compared to that of Formulation 2, which could be attributed to a higher catalysis efficiency in Formulation 3 (see Tables II and III).

However, the three formulations exhibited significantly different curing profiles, as shown in Tables II and III below:

TABLE II

ULTIMATE TENSILE STRENGTH (PSI)

| | FORMULATION | | |
|---|---|---|---|
| CURE TIME | 1 | 2 | 3 |
| (A) | | | |
| 2 HOURS | 231.762 | 138.943 | 355.033 |
| 4 HOURS | 253.859 | 828.601 | 1767.006 |
| 6 HOURS | 180.809 | 1405.072 | 2176.229 |
| 24 HOURS | 2165.125 | 2706.82 | 2597.221 |
| (B) | | | |
| 2 HOURS | 111.338 | 84.62 | 173.984 |
| 4 HOURS | 221.56 | 251.883 | 772.097 |
| 24 HOURS | 1741.688 | 1088.193 | 1108.005 |
| 48 HOURS | 1273.756 | 1368.829 | 1320.636 |
| 72 HOURS | 1773.444 | 1046.606 | 1288.299 |

TABLE III

% ELONGATION

| | FORMULATION | | |
|---|---|---|---|
| CURE TIME | 1 | 2 | 3 |
| (A) | | | |
| 2 HOURS | 17.89 | 84.299 | 742.789 |
| 4 HOURS | 15.844 | 1206.143 | 1244.708 |
| 6 HOURS | 53.134 | 1308.829 | 1135.648 |
| 24 HOURS | 1161.444 | 1191.589 | 1063.103 |
| (B) | | | |
| 2 HOURS | 21.718 | 21.466 | 40.114 |
| 4 HOURS | 20.962 | 366.289 | 1059.78 |
| 24 HOURS | 1430.15 | 1217.183 | 1104.229 |
| 48 HOURS | 1343.808 | 1303.21 | 1120.819 |
| 72 HOURS | 1375.491 | 1314.947 | 1132.066 |

The third formulation in accordance with the present invention exhibited much faster curing than the first formulation (as shown in Tables II and III) within the first 24 hours, especially during the first 6 hours. This is demonstrated by mechanical test (Instron) results, such as higher ultimate tensile strength (Table II) and higher elongation at break (Table III). The second formulation also exhibited an accelerated curing rate (as shown in Tables II and III), but to a lesser degree than the third formulation, especially during the first 4 hours or so.

The sample formulations were prepared and characterized as described below.

SAMPLE PREPARATION

1. Preparation of R243 (Formulation 1)

The Polyether polyol and Polyester polyol materials, with a total weight of 1770 grams based on the R243 formula, were added to a two-gallon Ross Planetary Mixer/Reactor and were mixed, under vacuum, at 240° F. for 30 minutes. After 30 minutes, 230 grams of 4,4'-diphenylmethane diisocyanate (MDI, Rubinate 44 from Huntsman Corporation) were added. The entire mixture was mixed and reacted under vacuum for 30 minutes at a temperature range of 230° F. to 250° F. The R243 was then packaged into moisture tight containers with a nitrogen blanket for further testing.

2. Preparation of R243 with DMDEE (Formulation 2)

R243 with DMDEE (Jeffcat DMDEE from Huntsman Corp.) was made following the completion of the reaction of MDI with polyols. Upon the completion of the reaction, 0.4 grams of DMDEE were added to the reactor. The materials were mixed under nitrogen for 20 minutes and then packaged into moisture tight containers with a nitrogen blanket for further testing.

3. Preparation of R243 with ZF-10 (Formulation 3)

R243 with ZF-10 (Jeffcat ZF-10 from Huntsman Corp.) was then made following the completion of the reaction of MDI with polyols. Upon the completion of the reaction, 0.4 grams of ZF-10 were added to the reactor. The materials were mixed under nitrogen for 20 minutes and then packaged into moisture tight containers with a nitrogen blanket for further testing.

Viscosity Procedure

Eleven grams of R243, R243 with 0.02% DMDEE and R243 with 0.02% ZF-10 were placed into thermosel test tubes for use on Brookfield RVT viscometers equipped with a thermosel and Brookfield 74R temperature controller. Each sample was placed into the thermosel preset at 250° F. A #28 spindle was used at 10 to 20 RPM for the duration of the test. The spindle was placed into the adhesive, with ambient conditions of 25° C. and 23% relative humidity. The viscosity of each sample was recorded at relevant times for recorded data points.

Yield Point

Approximately 35 grams of each sample was cast into a 50-mil film. 1½ inch long "dogbones" were cut from the 50 mil film and placed in an Instron 55R1123 and tested for yield point (the stress at which a marked increase in deformation occurred without an increase in load). This was done at relevant times for recorded data points.

Ultimate Tensile Strength

Approximately 35 grams of each sample were cast into a 50-mil film. 1½ inch long "dogbones" were cut from the 50-mil film and placed in an Instron 55R1123 and tested for ultimate tensile strength (the force per unit area under tension, at failure). This was done at relevant times for recorded data points.

Elongation

Approximately 35 grams of each sample were cast into a 50-mil film. 1½ inch long "dogbones" were cut from the 50-mil film and placed in an Instron 55R1123 and tested for percent elongation (percent length extended). This was done at relevant times for recorded data points.

The principal advantages of the disclosed moisture-curable hot melt adhesive is that the catalyst is reacted in and therefore does not contribute to VOC. Additionally, the hot melt adhesive provides an accelerated moisture cure rate, especially in the first 24 hours, without adversely affecting thermal stability. Since the catalyst does not escape from the system during application (i.e., are non-fugitive), more consistent curing results are thereby attained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A catalyzed reactive hot melt adhesive comprising before moisture curing:
   (a) a reactive, moisture-curable polyurethane adhesive; and
   (b) a catalytically effective amount comprising 0.005 to 0.1% by weight of at least one tertiary amine non-fugitive catalyst containing at least one active hydrogen, that provides at least one functional group that is capable of reacting with one or more isocyanate groups in a polyurethane prepolymer,
       so that the catalytically effective amount is incorporated into the polyurethane and a thermoset adhesive derived therefrom and so that the catalyzed reactive hot melt adhesive is formed in a non-volatile maimer at an accelerated curing rate.

2. The catalyzed reactive hot melt adhesive of claim 1 wherein the amine catalyst includes at least two tertiary amine groups.

3. The catalyzed reactive hot melt adhesive of claim 1 wherein the at least one active hydrogen comprises an hydroxyl group.

4. The catalyzed reactive hot melt adhesive of claim 1 wherein the at least one active hydrogen comprises an alkanol group.

5. The catalyzed reactive hot melt adhesive of claim 1 wherein the amine catalyst includes at least one tertiary amine group with at least one alkanol group attached to the at least one tertiary amine group.

6. The catalyzed reactive hot melt adhesive of claim 1 wherein the polyurethane adhesive includes a urethane prepolymer comprising the reaction product of:
   (a) at least one polyester polyol; and
   (b) at least one poly- or di-isocyanate.

7. The catalyzed reactive hot melt adhesive of claim 1 wherein the polyurethane adhesive includes a urethane prepolymer comprising the reaction product of:
   (a) at least one polyether polyol; and
   (b) at least one poly- or di-isocyanate.

8. The catalyzed reactive hot melt adhesive of claim 1 wherein the polyurethane comprises a urethane prepolymer comprising:
   (a) at least one polyester polyol;
   (b) at least one polyether polyol; and
   (c) at least one poly- or di-isocyanate.

9. The catalyzed reactive hot melt adhesive of claim 1 further comprising at least one ingredient selected from the group consisting of tackifying resins, plasticizers, fillers, antioxidants, colorants, stabilizers, flame retardant agents, adhesion promoters, rheology improvers, conducting agents, and UV dye indicators.

10. The catalyzed reactive hot melt adhesive of claim 1, wherein said catalyzed reactive hot melt of claim 1 is essentially free of volatile organic compounds (VOCs).

11. A method for shortening the moisture curing time of a moisture-curable polyurethane hot melt adhesive comprising the step of:

incorporating therein about 0.005 to about 0.1% by weight of one tertiary amine non-fugitive catalyst containing at least one active hydrogen, that provides at least one functional group that is capable of reacting with one or more isocyanate groups in a polyurethane prepolymer, so that the catalytically effective amount is incorporated into the polyurethane and a thermoset adhesive derived therefrom and so that the catalyzed reactive hot melt adhesive is formed in a non-volatile manner at an accelerated curing rate.

12. A method of making a catalyzed reactive hot melt adhesive comprising:

providing a moisture-curable polyurethane adhesive; and providing a catalytically effective amount comprising 0.005 to 0.1% by weight of at least one tertiary amine non-fugitive catalyst containing at least one active hydrogen, that provides at least one functional group that is capable of reacting with one or more isocyanate groups in a polyurethane prepolymer, so that the catalytically effective amount is incorporated into the polyurethane and a thermoset adhesive derived therefrom and so that the catalyzed reactive hot melt adhesive is formed in a non-volatile manner at an accelerated curing rate.

* * * * *

UNITED STATES PATENT AND TRADEMARK OFFICE
CERTIFICATE OF CORRECTION

PATENT NO. : 6,635,722 B2  
DATED : October 21, 2003  
INVENTOR(S) : Yingjie Li et al.

Page 1 of 1

It is certified that error appears in the above-identified patent and that said Letters Patent is hereby corrected as shown below:

Column 6,
Line 34, delete "maimer" and insert therefor -- manner --.

Signed and Sealed this

Twenty-fourth Day of February, 2004

JON W. DUDAS
*Acting Director of the United States Patent and Trademark Office*